United States Patent [19]

Hayasaka

[11] 4,109,545

[45] Aug. 29, 1978

[54] NOISELESS SPUR GEARS

[76] Inventor: Enakichi Hayasaka, 543-1, Ogikuba Odawara-shi, Kanagawa-ken, Japan

[21] Appl. No.: 762,578

[22] Filed: Jan. 26, 1977

[51] Int. Cl.$^2$ .................... F16H 55/12; F16H 55/30
[52] U.S. Cl. ................................ 74/447; 74/243 DR
[58] Field of Search .................. 74/446, 447 A, 462, 74/243 DR, 461, 411

[56] References Cited
U.S. PATENT DOCUMENTS 379,022   3/1888   Morgan ........................... 74/447 X

*Primary Examiner*—Leonard H. Gerin
*Attorney, Agent, or Firm*—George B. Oujevolk

[57] ABSTRACT

Spur gears of which the engagement is made noiselessly because of three adjustment functions wherein the central errors of the gears as rotary bodies are compensated by specific method of freeing the wheel center of a gear in a train of gears. The foundation parts (rim parts) of the gear teeth are subjected to qualitative treatment so as to have a large elasticity against maximum bending. The moment of forces working on said teeth are made to have a ring shape and the gears are arranged to have a large backlash. The holding mechanism is constructed so that the rotational center of the ring-shaped gears may be slightly movable in relation with the rotation center of the gear shaft. Backlash due to excessive vibration of the wheel center is prevented by providing a P.C.D. (pitch circle diameter) roller in a part of the holding mechanism together with the linear inclination of teeth center line or the elliptical transformation of the rim parts for the non-fitting teeth or rotational vibration caused by teeth engagement and the non-central rotation of the ring-shaped gear, so that the adjustment functions are transferred to next sequence.

11 Claims, 43 Drawing Figures

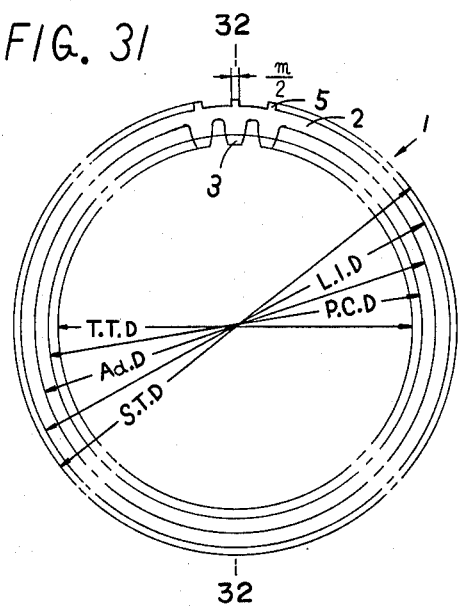
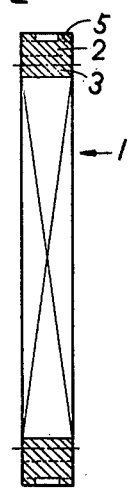
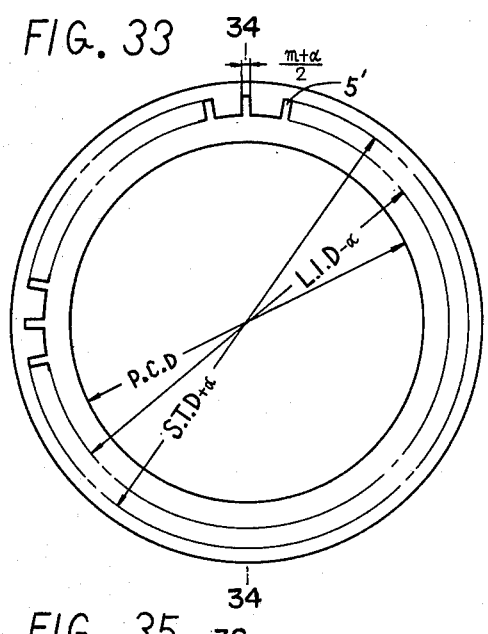
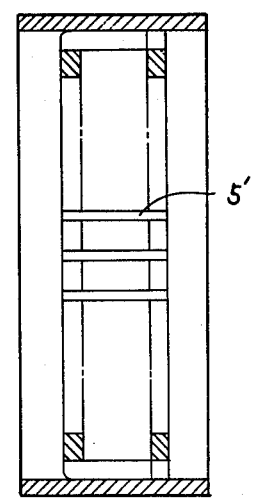
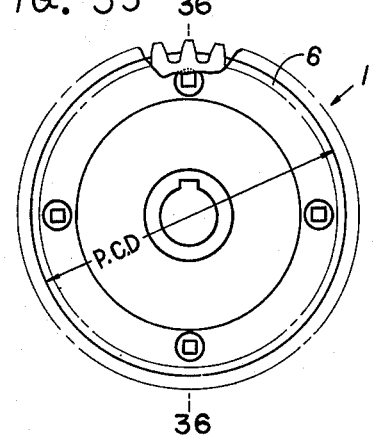
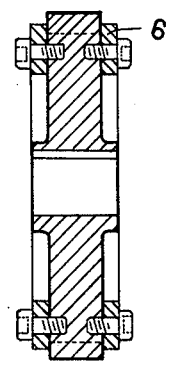

4,109,545

NOISELESS SPUR GEARS

DETAILED DESCRIPTION OF INVENTION

1. Background of The Invention

This invention relates to noiseless spur gears wherein the central errors of the gears as rotary bodies are compensated by a specific gear of which the wheel center is set free in the train of gears, the foundation parts of the gear teeth are subjected to qualitative treatment to have a great rigidity and elasticity to the bending moment which the foundation parts receive and are constructed so as to have a ring shape. Support means are provided so that sufficient elasticity stress can be obtained.

2. Description of Prior Art

Noise produced from engaging gears constitutes a complete loss. Only the improvement of grinding accuracy in making gears is said to be effective to prevent noise and it is necessary, therefore, that gears have a rigidity required for holding a fixed point on a true circle and the teeth shape is properly adjusted.

The thrust produced by the pressure angle formed when one gear engagement point gets in contact with a one-sided link results in the bent distortion of gear shaft. In addition, wheel center can hardly be set properly in gear mounting. It is overlooked that the whole structure of gears is not in proper engagement, that is, gear center is set out from wheel center. It is obvious that there is a large probability of the duplication of plus or minus central errors and the quadruplication thereof between two gears. It is useless, therefore, to attach an excessive importance to the grinding accuracy in making gears.

OBJECT OF THE INVENTION

An object of this invention is to provide noiseless spur gears to which noise energy is prevented from occurring and of which the transmission efficiency, the lifetime and the strength are increased thereby.

BRIEF DESCRIPTION OF THE DRAWINGS

FIG. 31 shows a side view of the construction of the ring-shaped gears.

FIG. 32 shows a XXXII—XXXII line sectional view of FIG. 31.

FIG. 33 shows a side view of the ring gear attachment roller for holding pitch circle diameter.

FIG. 34 shows a XXXIV—XXXIV line sectional view of FIG. 34.

FIG. 35 shows a side view of gears which holds pitch circle diameter accurately and of which discs of 1 module or so in thickness is fixed on the both sides.

FIG. 36 shows a XXXVI—XXXVI line sectional view of FIG. 35.

DETAILED DESCRIPTION OF PREFERRED EMBODIMENT

This invention is principally constructed by so-called ring-shaped gears of which the tooth foundation parts or rim parts are manufactured independently with the thickness thereof restricted so that the gear teeth, treated with material having a elasticity, have a sufficient strength to stand maximum bending moment acting thereon. The embodiments of the invention are shown in FIGS. 3-4, 11-12, 17-18, 25-26, 31-32.

The structual drawings shown in the other embodiment drawings show constructions for securely executing the engagement function of said ring-shaped gears in each mode of gear train construction. These drawings are FIGS. 5-6, 7-8, 13-14, 19-20, 21-22, 27-28, 33-34, 35-36.

Figure 37:
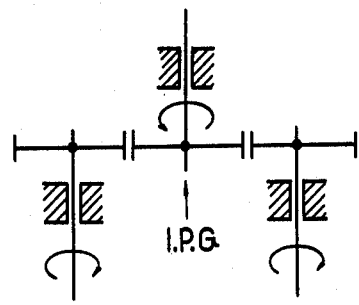
FIGS. 37 to 40 show a construction view of gear train respectively.
Figure 40:
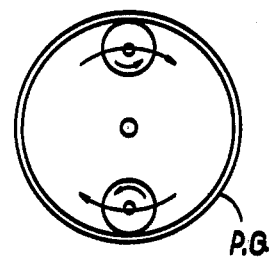

I shall use FIGS. 37 and 40 to explain the function of the gear according to the use thereof.

Then, I shall explain those shown in FIGS. 15–22 of the embodiments, illustrated as described above, of the construction of the flat rim ring-shaped gear mechanism.

Figure 16:
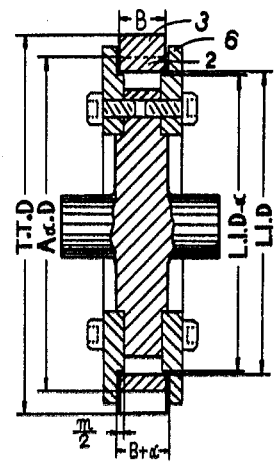
FIG. 16 shows a XVI—XVI line sectional view of FIG. 15.
Figure 17:
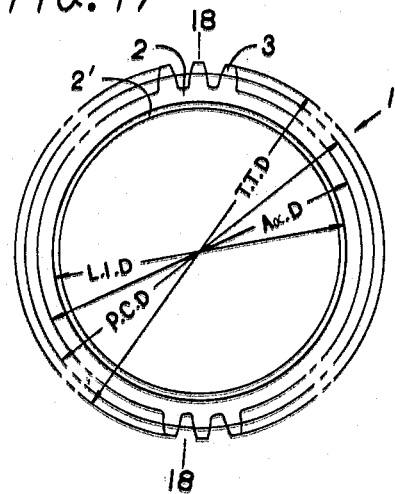
FIG. 17 shows a side view of the flat rim ring-shaped gears.
Figure 18:
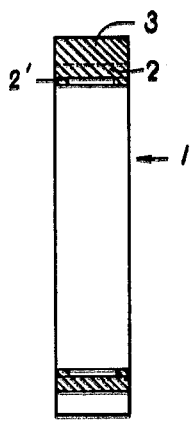
FIG. 18 shows an XVIII—XVIII line sectional view of FIG. 17.
Figure 19:
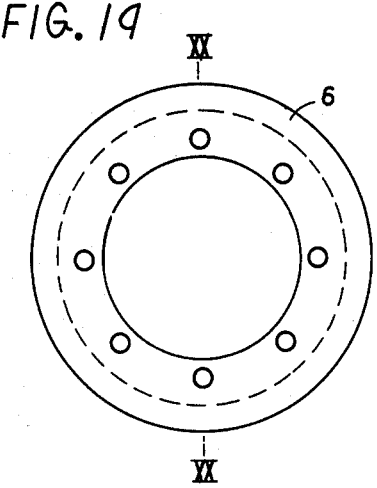
FIG. 19 shows a plan of the roller for holding pitch circle diameter.
Figure 20:
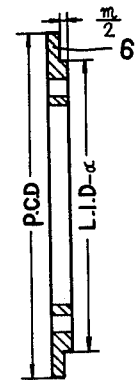
FIG. 20 shows a XX—XX line sectional view of FIG. 19.
Figure 21:
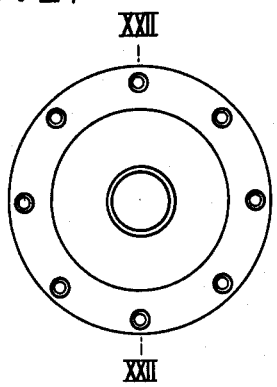
FIG. 21 shows a side view of the boss part.
Figure 22:
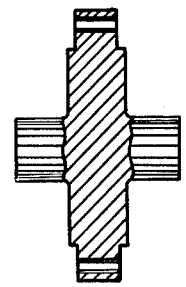
FIG. 22 shows a XXII—XXII line sectional view of FIG. 21.
Figure 23:
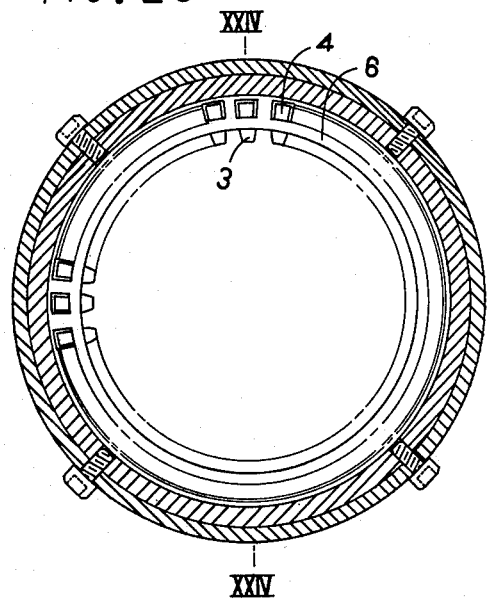
FIG. 23 shows an assembly side view of another construction of the noiseless spur gear mechanism with a horizontal spline.
Figure 24:
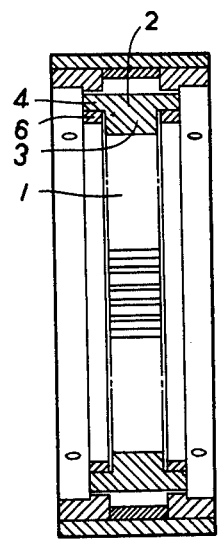
FIG. 24 shows a XXIV—XXIV line sectional view of FIG. 24.

The gears are manufactured as shown in FIGS. 17–18 and the rim parts 2 thereof are made to have, a thickness of slightly more than m/2 (m: module) of teeth and, by tempering only the rim parts 2 if the whole structure including teeth 3 is hardened, a high elasticity is obtained. A large backlash of 0.05–0.15m is provided in gear cutting. The purpose of the gears can be attained by gears made with low grinding accuracy or by forging or punching for example. The projection indicated by dotted line in said figures is provided in the required surface pressure with a width of less than m/2. The roller for holding, by suspending and mounting, the ring-shaped gears 2, 3, the P.C.D. (pitch circle diameter), and engagement fitting which is shown in FIGS. 19–20 is indicated by number 6 in FIGS. 15–16 and 19–20. The step part hardened into a disc and indicated by L.I.D.-α should measure less than m/2 in width so as to stand surface pressure and α value should be slightly below the backlash value of the teeth. Above said two bodies are fixed to the boss part shown in FIGS. 21–22, loose by α (0.02–0.05mm) to gear width B.

Figure 15:
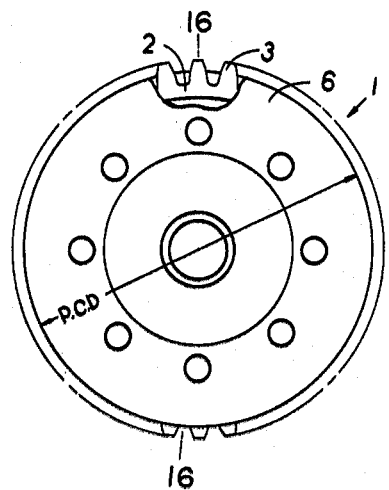
FIG. 15 shows an assembly side view of the flat rim ring-shaped gear mechanism.

The assembly of these parts is shown in FIGS. 15 and 16. The holder including the P.C.D. roller is rotated and eccentrically revolved by the roller in the loose condition of the boss-receiving part wherein the gear 1 has a construction capable of continuing by automatically obtaining both centripetal functions and balancing functions in contact with gear face to absorb the discontinuity of transmission.

The stress relation of the mechanism is divided into three steps, depending on load working on the gear, so that noiseless movement can be obtained among all loads.

At no load or small load, the distortion parts of engagement (principally, eccentricity) is absorbed. This is the primary function.

Figure 42:
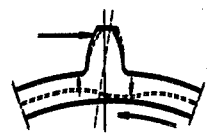
FIGS. 41 and 42 are descriptive drawings of the elastic running of the ring-shaped gears.
Figure 41:
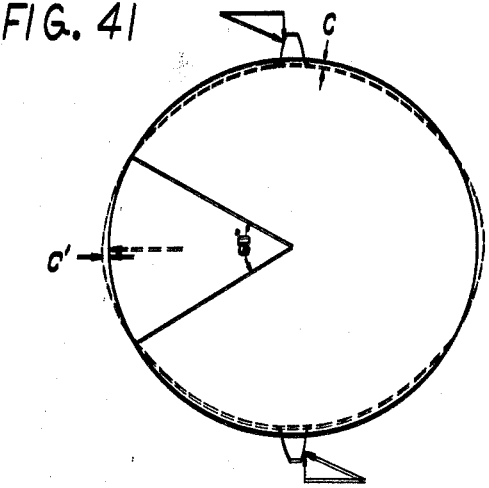

The secondary function is that, as shown in FIG. 41, the engagement point of the gear 1 generates thrust by mutual pressing from opposite points and, therefore, the rim part 2 receives elliptical distortion. That is, there is a large certainty that L.I.D./2 (in this case, the length of the arm of received moment) may be always larger than m so that the support points of bending moment becomes distant and elastic distortion function is liable to occur at small load. The clearance C shown in FIG. 41 is the limit (LID-α) of the elliptical distortion. When it is maximum, the gear becomes rigid enough to temporarily lose occurring elliptical distortion by getting closely in contact with the holder. As load increases, however, this appears as a problem of the distortion stress of each gear tooth as shown in FIG. 42. Thus, engagement unfitting (the non-accuracy of tooth shape) in large load is compensated and, therefore, the gear can continuously respond to the variation of load values.

Figure 43:
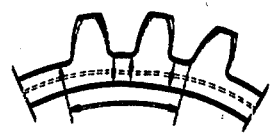
FIG. 43 is a descriptive drawing of the elastic running of the ring-shaped gears in a large-load process.

The tertiary function is that the distortion center lines of two teeth run in opposite direction as shown in FIG. 43. It is generally said that the engagement of more than one tooth should be avoided. As the result of examination, however, it has been confirmed that more than two teeth are engaged.

Important herein is that, although elastic material is used in the rim part of the gear, the elasticity of teeth is substantially lost if the rim part is fixed to the boss part, for example, by shrinkage fit. Nevertheless, clearance C shown in FIG. 41 becomes clearance C' so that proper elasticity distortion is obtainable.

Figure 39:
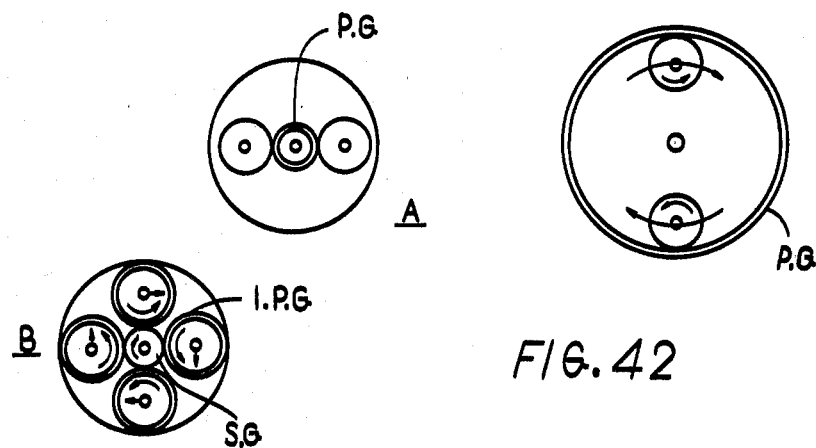

The above is applied to the cases where the gear is used in the combination made up as shown in FIG. 37, by inserting an intermediate gear I.P.G. provide with the devices of this invention into two gears as master-gear-pinion train or where the gear is used as intermediate gear I.P.G. in the inscribed and circumscribed planetary grear train shown in FIG. 39.

Figure 38:
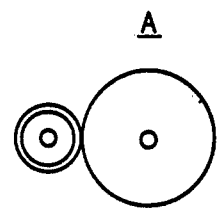

Next, I explain the construction of the noiseless gears P.G. of the combination shown in FIGS. 38 and 39A.

Figure 1:
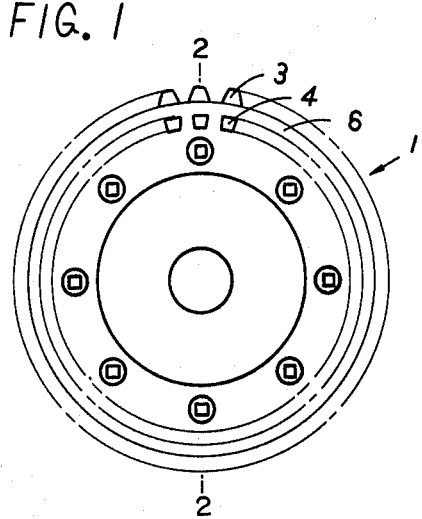
FIG. 1 shows an assembly side view of the noiseless spur gear mechanism with a horizontal spline.
Figure 2:
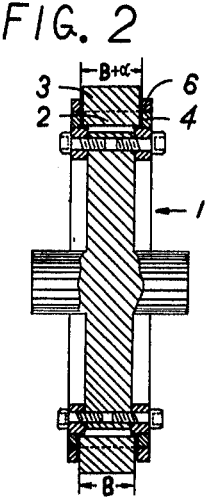
FIG. 2 shows a view of the II—II section of FIG. 1.
Figure 3:
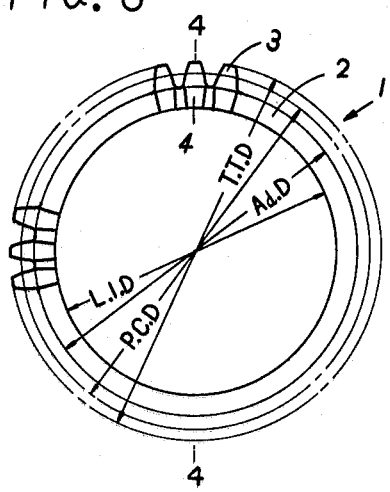
FIG. 3 shows a side view indicating the structure of the ring-shaped gears with a horizontal spline.
Figure 4:
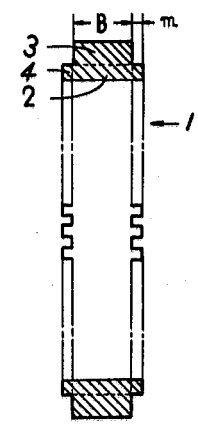
FIG. 4 shows a view of the IV—IV section of FIG. 3.
Figure 5:
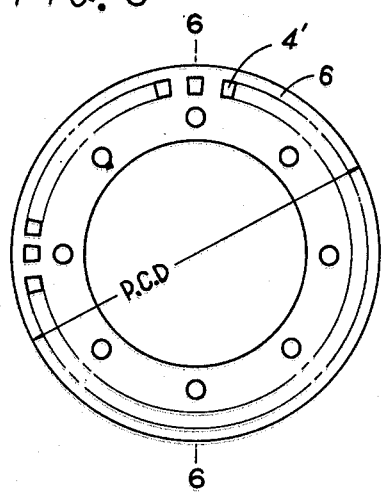
FIG. 5 shows a side view of the gear attachment roller for holding pitch circle diameter.
Figure 6:
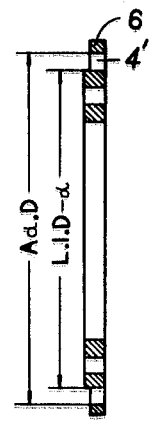
FIG. 6 shows a view of the VI—VI section of FIG. 5.
Figure 7:
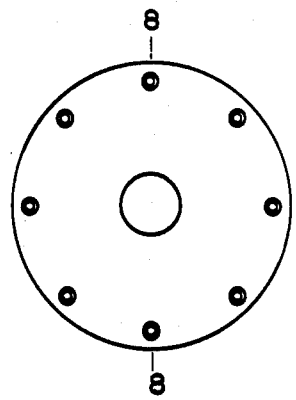
FIGS. 7 and 8 show parts to be inserted and bolted as boss parts.
Figure 8:
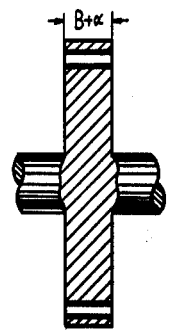
Figure 9:
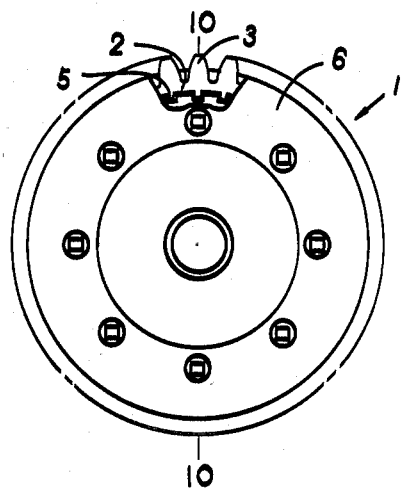
FIG. 9 shows an assembly side view of the inscribed spline type noiseless gear mechanism.
Figure 10:
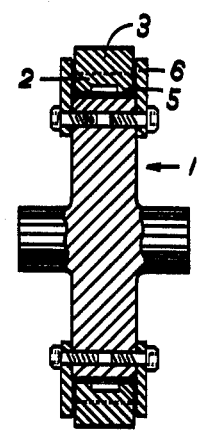
FIG. 10 shows a view of the X—X section of FIG. 9.
Figure 11:
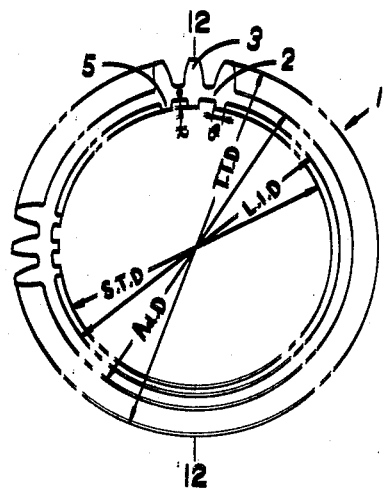
FIG. 11 shows a side view of the structure of a ring-shaped gears.
Figure 12:
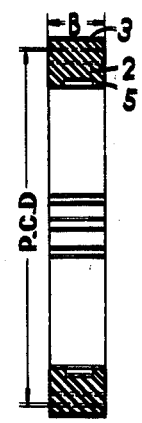
FIG. 12 is a view of the XII—XII section of FIG. 11.
Figure 13:
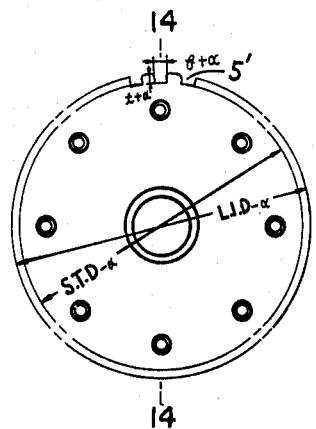
FIG. 13 shows a side view of the structure of the spline boss to be set in the gear shown in FIG. 11.
Figure 14:
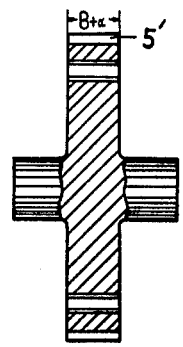
FIG. 14 shows the XIV—XIV sectional view of FIG. 13.

The ring-shaped gear is suspended from the holder thereof, as shown in FIGS. 11–12, to transmit rotation torque to the boss part. The gears have a construction capable of achieving the required function effect without losing the above-described characteristic, as shown in FIGS. 1–2 or 9–10, wherein projection parts 4 and 5 are provided on the both sides thereof or the both ends of the part thereunder, the depression parts 4' and 5' of the holders shown in FIGS. 5–6 and 13–14 respectively, which are to be engaged with the projection parts, are made to have a looseness equivalent to backlash, the gears provided with P.C.D. rollers 6 respectively are fixed with a boss spacer with a width B+α (α means space for enabling the ring-shaped gears to move up and down) as shown in FIGS. 7–8 and 13–14, and a ring-shaped gear is suspended. Thereby, eccentric absorbing function and elastic stress can be readily obtained so that the noiseless gears become capable of transmitting rotation torque to the boss part thereof.

Heretofore described are the noiseless gears employed as circumscribed or inscribed and circumscribed intermediate gear and I.P.G. or P.G.

Figure 25:
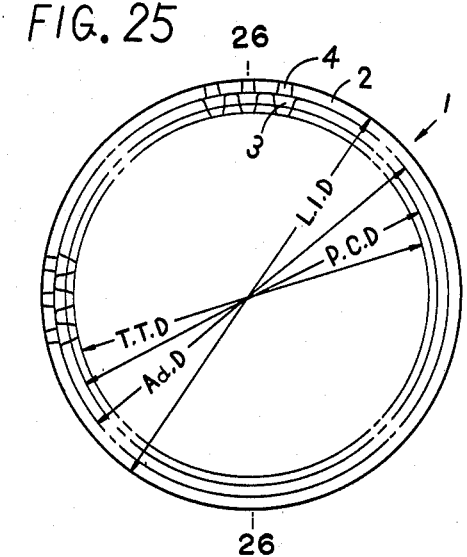
FIG. 25 shows a side view of the structure of the ring-shaped gears with a horizontal spline.
Figure 26:
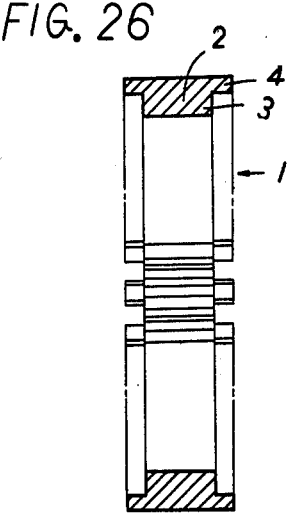
FIG. 26 shows a XXVI—XXVI line sectional view of FIG. 25.
Figure 27:
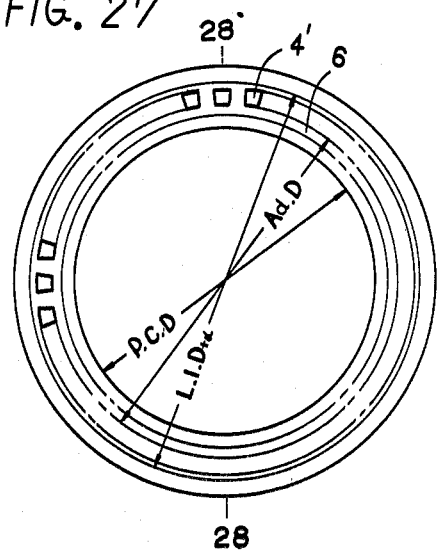
FIG. 27 shows a side view of the ring gear attachment roller for holding pitch circle diameter.
Figure 28:
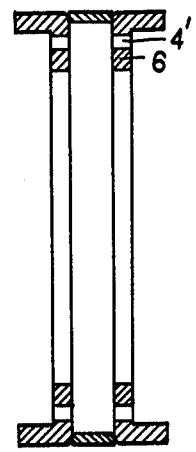
FIG. 28 shows a XXVIII—XXVIII line sectional view of FIG. 27.
Figure 29:
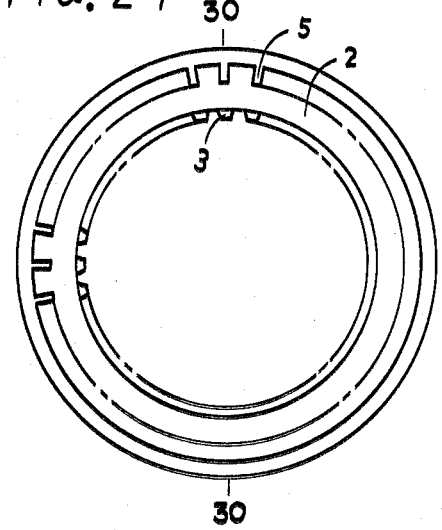
FIG. 29 shows an assembly side view of the circumscribed spline type noiseless gear mechanism as another construction of the inscribed spline type noiseless gear mechanism.
Figure 30:
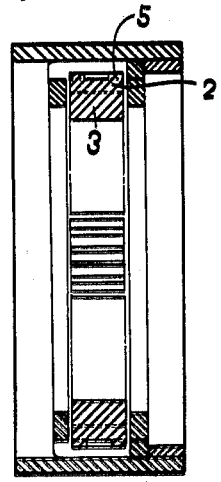
FIG. 30 shows a XXX—XXX line sectional view of FIG. 29.

The ring-shaped gear is employed as inscribed gear in the inscribed gear combination as shown in FIG. 40 for quite the same reason. A projection pawl 4 is provided at the center of the teeth on the both side ends of the rim part as shown in FIGS. 25–26. Or, a projection 5 is provided on the both ends of the upper face of the rim part for rotation torque transmission as shown in FIGS. 31–32. The difference of the working thereof comes merely from the opposite location of the ring-shaped gear and its holder in vertical direction. Therefore, said embodiment is only illustrated but the working thereof is not explained. The assembly thereof is performed as shown in FIGS. 23–24 and 29–30 and the types of the holder and the P.C.D. roller used therein are shown in FIGS. 27–28 and 33–34.

FIGS. 35–36 show the hardened disc roller 6 fixed on the both sides of an ordinary-type gear 7 with screws. The gears perform most effective shaft bearing function, prevent teeth bite of the noiseless gears and conveniently constitute master-gear-pinion type.

What I claim is:

1. A noiseless spur gear comprising in combination:
   a. a ring defining the rim of the gear;
   b. radial teeth disposed around said ring, and integral therewith, said radial teeth having a greater modulus of elasticity than the ring so as to have a large backlash;
   c. a holding two-disc mechanism disposed on both sides of said ring including an aperture for mounting said two discs on an axle, said aperture defining the rotational center of said gear; and,
   d. holding means holding said ring including slippage means so that the rotational center of the ring may be slightly moveable in relation to said defined rotational center, whereby said construction provides for a linear inclination of the tooth center line, the elliptical deformation of the rim and the rotational vibration of the gear teeth.

2. The noiseless spur gears wherein the noiseless spur gears described in claim 1 are used as intermediate gears in an ordinary master-gear-pinion train thereby to make noiseless the engagement of the whole gear train.

3. The noiseless spur gears of such a combination that either of the master-gear-pinion trains are the noiseless spur gears described in claim 1.

4. The noiseless spur gears having a construction wherein a projection pawl is provided on the both sides of tooth as means which the rim part described in claim 1 uses, in ring-shaped gears, to transmit rotation torque to the shaft without affecting the function thereof, and the gears are suspended on the depression to which a looseness within the range of the backlash of the gears is given so that the gear can move slightly when engaged with the holder thereof.

5. The noiseless spur gears having a ring-shaped gear and a construction described in claim 4 wherein the distribution of the elastic stress to the bend moment of the ring shaped gear teeth is averaged along teeth thanks to the construction with the holding points located in part of the both end.

6. The noiseless spur gears having a construction wherein a projection pawl is provided under the tooth inside the ring-shaped rim and on the both ends of tooth as means which the rim part described in claim 1 uses to transmit rotation torque to the shaft without affecting the function thereof, and the gears are suspended on the depression to which a looseness within the range of the backlash of the gears is given so that the gear can move slightly when engaged with the holder thereof.

7. The noiseless spur gears having a ring-shaped gear and a construction described in claim 6 wherein the distribution of the elastic stress to the bend moment of the ring shaped gear teeth is averaged along teeth thanks to the construction with the holding points located in part of the both ends.

8. The noiseless spur gears having a construction wherein such a component as planetary gear mechanism and intermediate gear for transmitting only revolution torque without affecting the function of the ring-shaped gears is provided for the gears described in claim 1, the inside diameter face of the rim part is made plain, said gears are suspended on the holding mechanism to which a looseness is given so that the center of the gears can move within the backlash of the tooth only in a part of the both side ends of the rim part.

9. The noiseless spur gears having a ring-shaped gear and a construction described in claim 8 wherein the inside diameter part of the gear rim part is made plain, a narrow plain projection is provided in the both side ends of the holder, the gears are suspended thereon, and the elastic stress of the bend moment of gear teeth is averaged along teeth.

10. The noiseless spur gears having a ring shaped gear and a construction described in claim 8 wherein the inside diameter part of the gear rim part is made plain, a narrow plain projection is provided on the both ends of the gear rim part, the gear is suspended on a plain holder, and the elastic stress of the bend moment of gear teeth is averaged along teeth.

11. The noiseless spur gears having a construction of the ring-shaped gear and the holding mechanism thereof described in claim 1 wherein a disc roller with a reference pitch circle diameter for gear engagement is provided so as to form a single structure with the holder for preventing bite impact of teeth by excessive occurence of elasticity distortion and for bearing function, the ring-shaped gears work slowly, and inscription or circumscription engagement is regulated properly.

* * * * *